United States Patent [19]

Hunter

[11] Patent Number: 4,599,897
[45] Date of Patent: Jul. 15, 1986

[54] TUBULAR SHAPED SLED TEST COMPLEX

[75] Inventor: Joe S. Hunter, Huntsville, Ala.

[73] Assignee: The United States of America as represented by the Secretary of the Army, Washington, D.C.

[21] Appl. No.: 718,033

[22] Filed: Mar. 29, 1985

[51] Int. Cl.$^4$ .................... G01M 19/00; G01M 9/00
[52] U.S. Cl. ..................................... 73/432 R; 73/147
[58] Field of Search ................ 73/432 K, 432 R, 12, 73/147, 167, 79, 1 D, 2, 432 V, 432 Z

[56] References Cited

U.S. PATENT DOCUMENTS

| | | | |
|---|---|---|---|
| 3,597,969 | 8/1971 | Carchack | 73/12 X |
| 3,693,432 | 9/1972 | Stewart et al. | 73/12 X |
| 3,823,600 | 7/1974 | Wolff | 73/12 |
| 3,845,665 | 11/1974 | Cappetta et al. | 73/432 K |
| 4,069,702 | 1/1978 | Hayner | 73/432 K |
| 4,311,035 | 1/1982 | Gold | 73/12 X |

FOREIGN PATENT DOCUMENTS 968654 10/1982 U.S.S.R. ................... 73/12

Primary Examiner—Stewart J. Levy
Assistant Examiner—Tom Noland
Attorney, Agent, or Firm—Anthony T. Lane; Robert P. Gibson; Harold W. Hilton

[57] ABSTRACT

A sled test facility employing a tubular shaped track for testing missile and aircraft guidance and control systems. A blockhouse is at one end of the track and a recovery station at the other end. A compressor in the blockhouse and recovery station controls the g-profile of the sled as the sled moves in a cushion of air in the tubular track. Instrumentation and controls are provided in the blockhouse and recovering station.

4 Claims, 3 Drawing Figures

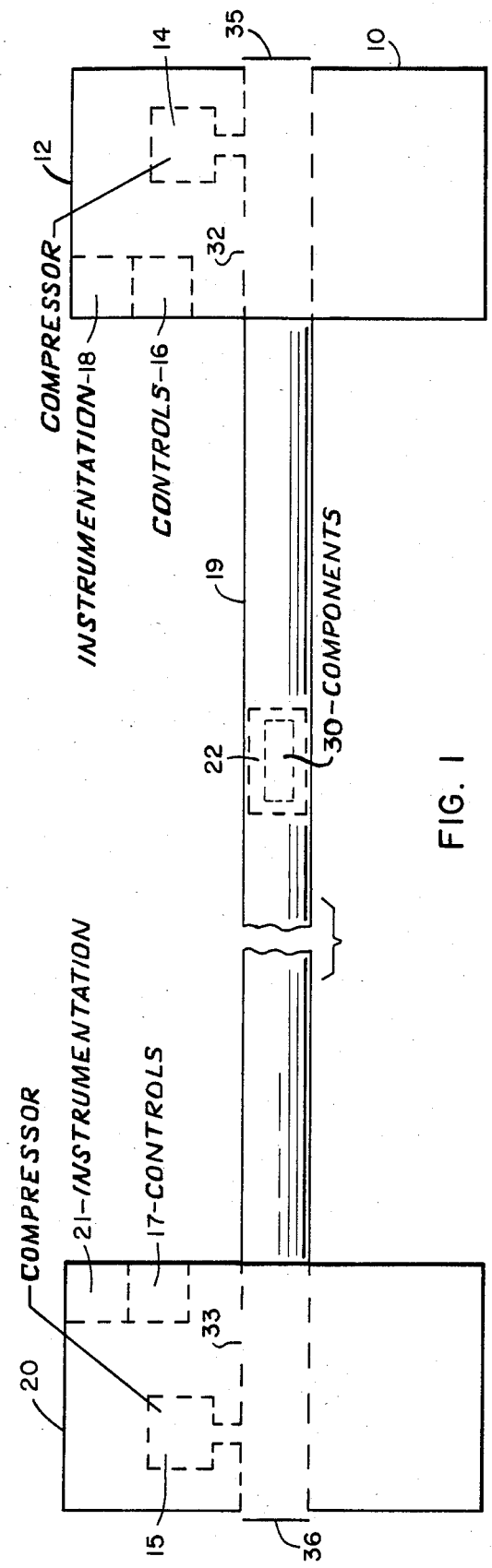
FIG. 1
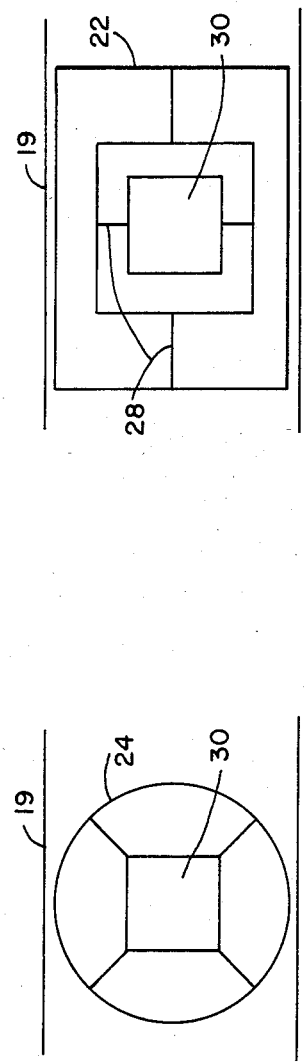
FIG. 3
FIG. 2

TUBULAR SHAPED SLED TEST COMPLEX

DEDICATORY CLAUSE

The invention described herein may be manufactured, used, and licensed by or for the Government for governmental purposes without the payment to me of any royalties thereon.

BACKGROUND OF THE INVENTION

Conventional sled test facilities operate with either one or two tracks and require rocket motors to move the sled down the track. Gravity profile is difficult to control and a water braking system is required to slow the sled down to a stop. The water has to be replenished and the water gates have to be replaced after every sled run, making it difficult to make more than one sled run per day. Tests can only be conducted in one direction on a conventional sled. After a run, the sled must be hauled back to the blockhouse area, where it is reinstrumented and new rocket motors are installed. There is always a danger that the sled may leave the track during any run. A conventional sled can only be operated during fair weather since the track and sled are both exposed to the elements.

The present invention utilizes a tube having the sled or carrier carried therein. Pressure differentials are created on opposite ends of the sled. This is done by opening the tube on one end of the sled and pressurizing the tube at the other end of the sled. Thus the present invention overcomes the disadvantages associated with a conventional sled test facility by eliminating the rocket motors and operating in a tube which may be placed underground, if desired. The use of a pressure differential system to establish the g-profile also eliminates the need for a water brake to stop the sled since reversing the pressure differential accomplishes the same purpose. Consequently, the present invention allows many sled runs to be made per day, since the sled can be run in either direction and does not require the installation of rocket motors after each test. The tubular track facilitates 24 hours, all weather operation since the track temperature will be nearly constant and the sled will not be exposed to changing weather conditions if the tube is underground.

SUMMARY OF THE INVENTION

The apparatus of the present invention is a sled test complex with a tubular shaped track for conducting sled tests on missile and aircraft guidance and control components and systems. A cylindrical or spherical shaped sled moves on a cushion of air through the tubular shaped track and is propelled by differential pressures.

The g-profile of the sled is controlled by a compressor at each end of the tubular track. The compressors are programmed to create a pressure differential which moves the sled at the desired rate. The sled is stopped by reversing the pressure differential.

The track may be placed either above or below ground level. Placing the track below ground level provides near constant year round temperature. Each end of the test track will have access doors for installing and instrumenting test items. Test data will be recorded via on-board tape recorders and telemetry.

An object of the present invention is to provide an all weather, fast reaction facility for conducting sled tests on missile and aircraft guidance and control components and systems.

Another objective of the invention is to increase the flexibility and improve the safety of sled testing. The computer controlled compressor increase the g-profile flexibility and the tubular shaped track improves the safety by providing a self contained inclosure for the sled.

BRIEF DESCRIPTION OF THE DRAWINGS

FIG. 1 is a diagrammatic drawing of the tubular shaped sled test complex.

FIGS. 2 and 3 diagrammatically illustrates the spherical and cylindrical sled configurations, respectively.

DESCRIPTION OF THE PREFERRED EMBODIMENT

Referring now to the drawings, there is disclosed a preferred embodiment of the invention in FIG. 1. FIG. 1 is a diagrammatic drawing of the tubular shaped test complex 10. As previously stated, the entire complex may be located underground. Both the blockhouse 12 and the downrange recovery station 20 contain compressors 14 and 15, controls 16 and 17 and instrumentation 18 and 21. The Compressors 14 and 15 provide the pressure differential for moving the payload down the tubular track 19. The controls 16 and 17 contain the microprocessors that control the interaction between the two compressors 14 and 15 and, thus shape the g-profile. The instrumentation 18 and 21 is made up of telemetry receivers, tape recorders, signal processors and conditioners and other ancillary data reduction equipment. The tubular shaped track 19 extends from the blockhouse 12 to the downrange recovery station 20 (see FIG. 1). The blockhouse 12 and the downrange recovery station 20 can be used interchangeably (i.e., the blockhouse 12 can be used for a recovery station 20 and the recovery station 20 can be used for a blockhouse 12.

Referring next to FIGS. 1, 2 and 3, a more indepth description of the sled test facility is disclosed. The sled (or payload carrier) may be cylindrical 22 (see FIG. 3) or spherical 24 (see FIG. 2) in shape. A cylindrical carrier 22 constrains the motion of the payload to the roll axis. However, pitch and yaw maneuvers can be accomplished by providing gimbals 28 for the payload within the cylindrical structure. The spherical payload carrier 24 can perform various combinations of pitch, yaw and roll maneuvers. The test components 30 are carried in carrier 22 and 24.

The payload carriers are propelled down the tubular track by a differential compressor system 14 and 15. The g-profile is controlled by a microprocesor which is part of the controls 16 and 17 system. This is accomplished as follows: The microprocessor is programmed for the desired g-profile. In order to establish the g-profile, such things as the cross section of the payload carrier 22 and 24 and the weight of the payload must be taken into account. When the blockhouse compressor 14 is operating alone, recovery station vent 36 is open to exhaust the air ahead of the payload 22 or 24. When recovery station compressor 15 is operating alone, blockhouse vent 35 is open to exhaust the air ahead of the payload 22 and 24. During actual operation, both the compressors 14 and 15 will operate under microprocessor control to provide the required g-profile. The exhaust vents 35 and 36 will also be microprocessor controlled to provide variable exhaust from zero to full as required. The vents are pivotably secured to the ends of tube 19 and controlled by solenoids or the like. The differential pressure approach to controlling the g-profile will also allow the payload carrier to be stopped at the desired location under microprocessor control The payload carrier can be reversed at the recovery station by creating a positive pressure on the recovery station end of the carrier. Access ports 32 and 33 to the tubular shaped track 19 are located in the blockhouse 12 and the down range recovery station 20.

The payload carrier may be levitated in the tube by a hydrodynamic air cushion (i.e., enough air will flow over the payload carrier from the compressors to float it in the tube). An alternate approach would be to carry an onboard gas bottle to provide a hydrostatic air cushion to levitate the sled during a run. The gas bottle could be replenished with air periodically.

The sled test facility of the present invention employs a tubular shaped track for testing missile and aircraft guidance and control systems and components.

The function of the sled test complex is to provide a realistic simulation of selected portions of flight trajecories under accurately programmed, closely controlled and monitored conditions. The test capabilities provided by the tubular shaped sled test complex occupy a distinct gap in the overall spectrum of missile and aircraft ground testing by providing the missing link between laboratory type investigations on one side and full scale flight tests on the other.

Sled testing provides an efficient, safe, and cost effective ground test alternative to expensive developmental flight tests for a wide range of test applications. In addition to its ability to rigorously define and repeat specific environments and performance envelopes, to recover the test speciman after the test and to eliminate crew safety hazards: sled testing avoids the cost and time delay inherent in preliminary flight rating of experimental hardware, and frequently offers data acquisition capabilities which are not achievable in flight testing.

Sled testing of guidance systems and components is an important function of a sled testing complex. It fills a distinct data gap between laboratory investigations and full scale qualification flight tests. Laboratories provide information on errors produced by factors which are individually applied in separate tests. Flight tests provide the ultimate proof of overall system performance. They, however, rarely afford an opportunity to pinpoint error sources in case of failure, because the test item is lost after firing and restrictions in on-board instrumentation prevent a conclusive evaluation of individual component malfunctions.

Sled testing closely simulates the typical acceleration profile of an actual missile, flight in combination with translation and angular vibrations. Furthermore, it is relatively inexpensive as compared to flight tests. It allows recovery of the payload, practically unlimited onboard data acquisition equipment, and a highly accurate reference instrumentation system.

In addition to the basic guidance system applications, sled testing is useful in evaluating subsystems and components such as accelerometers, gyros, missile computers, aircraft avionics systems and flight control systems.

Sled track length may vary from 20,000 feet to 50,000 feet depending on test requirements. The tubular track may be placed either above or below the ground level. Placing the track below ground level provides a near constant year round temperature. The diameter of the tubular track should be large enough to provide access for workman to install the payload (i.e. >3 feet) and should be big enough to accommodate reasonable installing and instrumenting test items. Test data is recorded via onboard tape recorders and telemetry.

I claim:

1. A sled test facility for testing components comprising:
   a. a blockhouse;
   b. a tubular shaped track having a first end communicating into said blockhouse;
   c. a recovery station disposed at the second end of said tubular track;
   d. a carrier in said tubular track, said carrier having said test components therein;
   e. said blockhouse and said recovery station each carrying a compressor, said compressors disposed for creating pressure differentials across said carrier for moving said carrier at a desired rate; and,
   f. instrumentation means carried in said blockhouse and in said recovery station.

2. Apparatus as in claim 1 wherein said tubular track is provided with access ports positioned in said blockhouse and in said recovery station.

3. Apparatus as in claim 2 wherein said carrier is cylindrical.

4. Apparatus as in claim 2 wherein said carrier is spherical.

* * * * *